United States Patent [19]

Dejaegher

[11] Patent Number: 4,825,214
[45] Date of Patent: Apr. 25, 1989

[54] FREQUENCY-MODULATED CONTINUOUS WAVE RADAR FOR RANGE MEASURING

[75] Inventor: Daniel Dejaegher, Massy, France

[73] Assignee: U.S. Philips Corporation, New York, N.Y.

[21] Appl. No.: 84,656

[22] Filed: Aug. 11, 1987

[30] Foreign Application Priority Data

Aug. 27, 1986 [FR] France .................. 86 12132

[51] Int. Cl.⁴ .................. G01S 13/32
[52] U.S. Cl. .................. 342/128; 342/165
[58] Field of Search .............. 342/122, 128, 165, 369, 342/372

[56] References Cited

U.S. PATENT DOCUMENTS

| | | | |
|---|---|---|---|
| 2,147,810 | 2/1939 | Alford | 342/122 |
| 2,520,553 | 8/1950 | Lawson | 342/128 |
| 3,229,286 | 1/1966 | Samuel et al. | 342/128 X |
| 3,256,520 | 6/1966 | Blitz | 342/128 |
| 3,605,094 | 9/1971 | Peperone | 342/128 |
| 3,735,402 | 5/1973 | Mosher | 342/128 X |
| 4,682,175 | 7/1987 | Lazarus | 342/165 |

OTHER PUBLICATIONS

Skolnik, "Introduction to Radar Systems", 1980, McGraw-Hill, pp. 72-73.

Primary Examiner—Thomas H. Tarcza
Assistant Examiner—Mark Hellner
Attorney, Agent, or Firm—Robert J. Kraus

[57] ABSTRACT

The radar includes a linearly frequency-modulated microwave frequency signal generator (1), a transmitter-receiver antenna (2) and coupling means (3, 6; 48) in order to sample a local oscillation signal and an echo signal and in order to transmit these two signals to the inputs of a mixer (5) which provides at its output a subtractive beat signal between these two signals. The line lengths are adjusted in order to produce a static adjustment of the phase between the local oscillation signal and the interference antenna reflection signal. A phase control loop including an amplifier (36) and a low-pass filter (37) is connected between the output of the mixer and an input of a phase-shifting circuit (35; 54) placed in the local oscillation channel; the closed control loop cut-off frequency is just below the frequency of the subtractive beat signal.

9 Claims, 3 Drawing Sheets

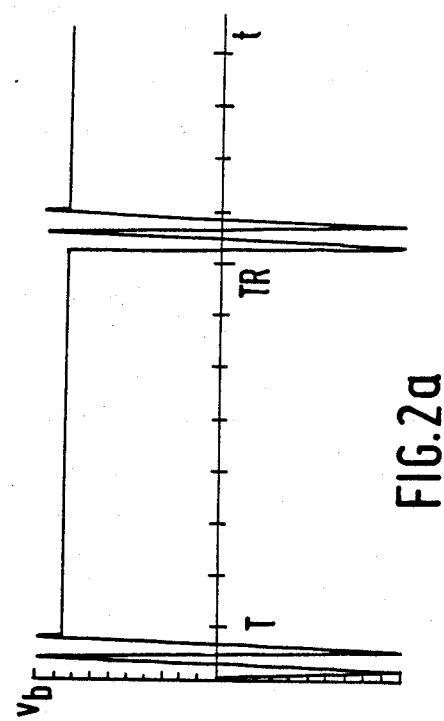
FIG.2a
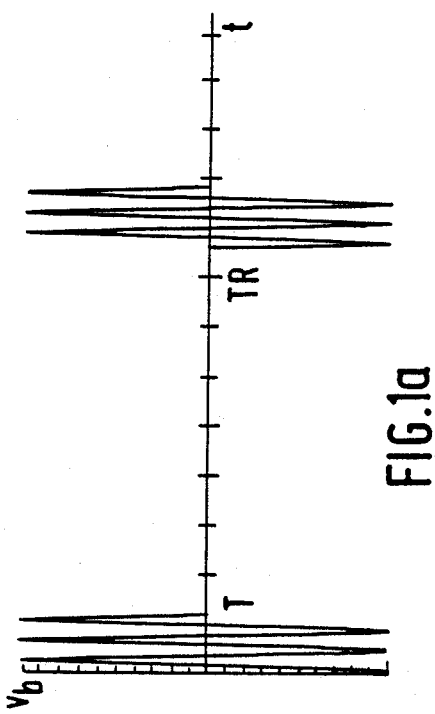
FIG.1a
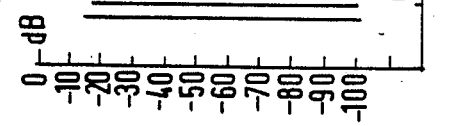
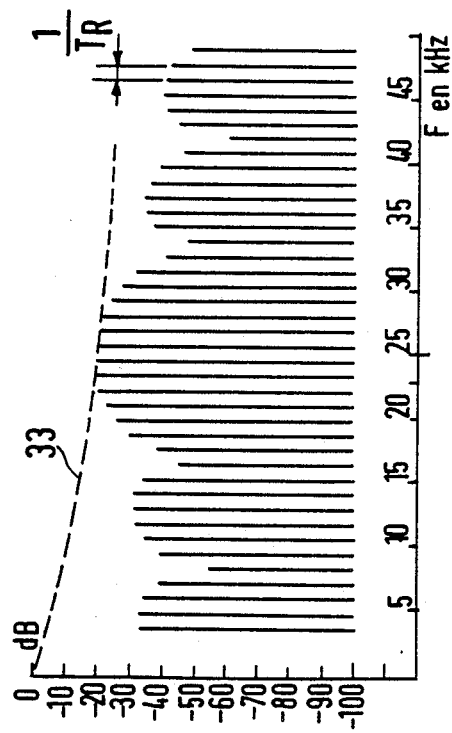
FIG.1b
FIG.2b

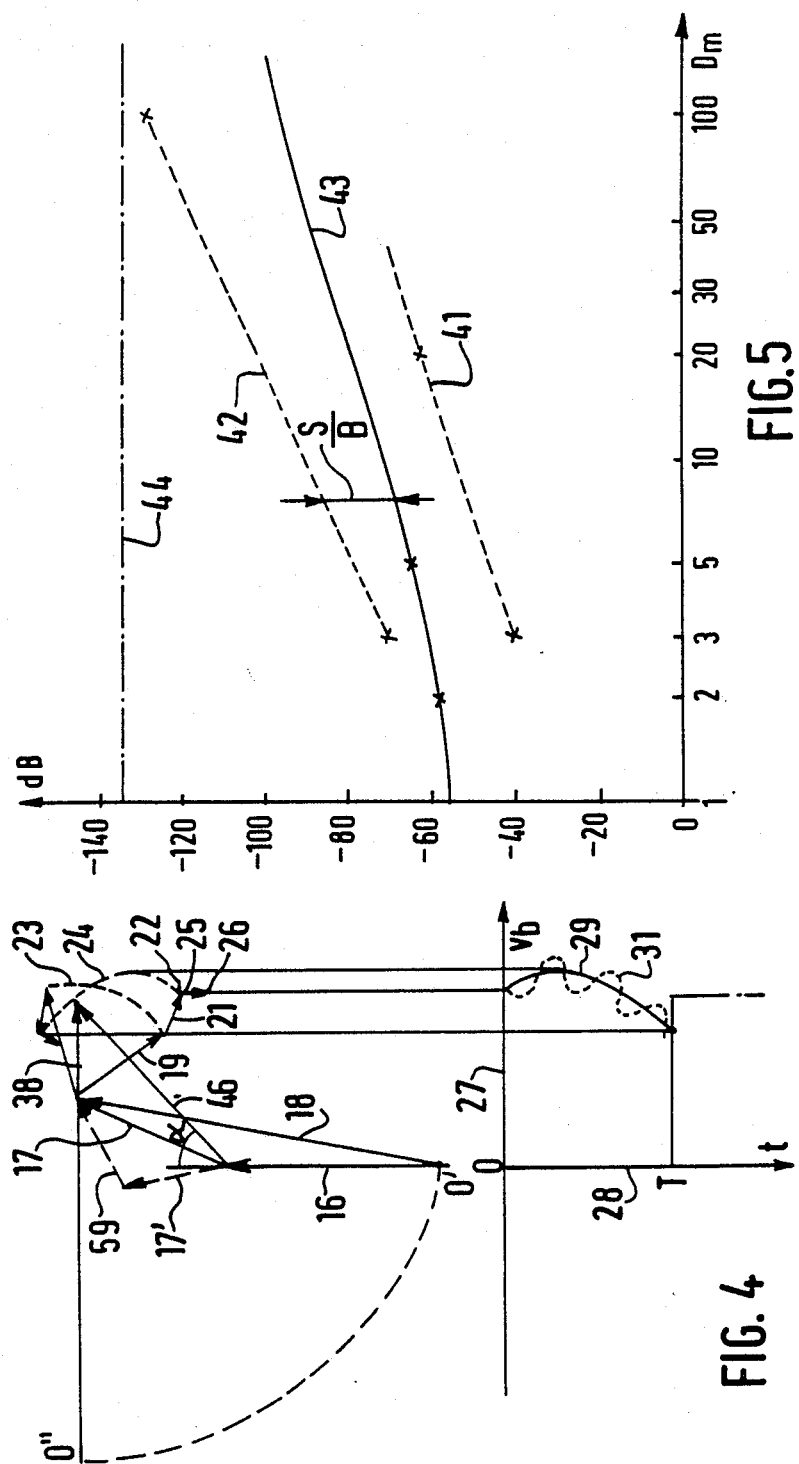

FREQUENCY-MODULATED CONTINUOUS WAVE RADAR FOR RANGE MEASURING

BACKGROUND OF THE INVENTION

The invention relates to a radar system of the frequency modulated continuous wave type (FM/CW), intended for range measuring, including a linearly frequency modulated microwave signal generator, a transmitter-receiver antenna, and deriving means for deriving a fractional signal of the transmitted wave called the local oscillation signal and for deriving a fractional signal of the received echo wave and for transferring the said two signals to the inputs of a mixer, in which the lengths of the transfer lines are adjusted so that at least the interference internal coupling signal due to the antenna reflection has, up to the mixer, the same propagation time as the local oscillation signal with the possibility of static adjustment of the phase between these two signals.

Radars with single antennas are used, in general, for measuring long ranges. The power is, in this case, sent in trains of waves, which enables independence from the internal interference echoes of the radar. The invention proposes to produce a radar with a single antenna which can measure short ranges, in the order of a few meters; it applies more particularly to radioaltimetric probes which can be used on board missiles and are capable of measuring ranges as small as 3 meters.

The main disadvantages of radar or radioaltimeter systems with two antennas, this being mentioned as a technical problem of the background of the invention, are as follows: the antennas cannot be integrated with the equipment, but must be fixed on the side of the carrying aircraft and interconnected with the equipment by means of transmission lines whose transmission delay must be calibrated, these lines being able to be the source of errors in the measurement of range. In addition, when the distance separating the antennas is not negligible compared with the distance from the ground or from the object to be detected, the geometry of the antenna system becomes imperfect, which again results in a source of errors at small ranges. Finally, it is desirable to simplify the antenna system for purposes of compactness, installation in the aircraft, and, in general, economy.

It is assumed hereafter that the radar transmits an asymmetrical saw-tooth waveform with a constant positive slope for a given range, these saw teeth, of duration T, being separated by (constant) level sections, i.e. these sawteeth are produced with a repetition period $T_r$ in which $T_r$ is greater than T, whatever T may be. Under these conditions, the general formula which expresses the actual functional mode of the radar is:

$$f_b = \frac{\tau \cdot \Delta F}{T} \quad (1)$$

where:
$f_b$ : subtractive beat frequency between the transmitted wave and the received echo wave;
$\tau$: delay time between transmitted wave and received echo wave;
$\Delta F$: frequency excursion of transmitted signals or wobulation frequency.
The actual range D has a linear relationship with the delay $\tau$, according to the formula:

$$\tau = 2D/c \quad (2)$$

By combining the formulae (1) and (2) the following basic formula is obtained:

$$T = \frac{2\Delta F}{c \cdot f_b} D \quad (3)$$

c being the speed of an electromagnetic wave in air. The useful signal is produced by a mixer which produces the subtractive beat between the local oscillation, sampled from the transmission, and the received waves. If $V_{OL}$ is the voltage of the local oscillator and $V_R$ is that of the received wave, the beat output voltage $v_b$ of the mixer is equal to:

$$v_b = K \cdot V_{OL} \cdot V_R \cdot \sin(2\pi f_b t + \rho) \quad (4)$$

where
$$\rho = 2\pi \cdot \tau \cdot F_{min}$$

$F_{min}$ being the minimum frequency of the transmitter and K being the conversion coefficient of the mixer. In the case of a saw-tooth modulation, the signal generally used in radioaltimeters is constituted from a succession of sinusoidal trains, whose duration T is that of the saw teeth, separated by (constant) level sections $T_r - T$. At each level section, the beat frequency $v_b$ of the mixer is fixed at the value:

$$V_b = K \cdot V_{OL} \cdot V_R \cdot \sin\gamma \quad (5)$$

It will be noted that the period of the beat signal corresponds with the wobulation repetition period $T_R$. Its frequency spectrum is therefore formed of harmonics of the frequency:

$$f_R = 1/T_R$$

The spectrum of the beat signal can be calculated by Fourier transform from its temporal form. It represents the power density at the harmonics of the wobulation frequency $f_R$. Starting from this calculation, it is possible to analyse the spectra by varying the different parameters and particularly by observing their evolution at short ranges. Among several possible options for the functioning of the radar, it is preferably chosen to adjust the beat frequency $f_b$ of the signals to the fixed tuning frequency $f_{bo}$ of the receiver. For the calculations, $f_{bo}$ is for example given the value 25 kHz. The analysis of the spectra enables the following phenomena to be observed:

The envelope of spectrum approximates to a sin x/x curve centered on the frequency $f_{bo}$ when the number n of periods of the sinusoid according to the above formula (4) is rather large, during the wobulation, and of the order of 10 or more, this number n being able to be expressed by:

$$n = f_b \cdot T \quad (6)$$

or by
$$n = \tau \cdot \Delta F \quad (7)$$

When the number n is equal to a few units only, the sin x/x curve is distorted and the maximum shifts towards the low frequencies; to a first approximation, the relative error in the measurement of the range D is equal to:

$$\frac{\Delta D}{D} = \frac{|F_M - f_{bo}|}{|f_{bo}|}$$

where: $F_M$ = the frequency of the maximum of the spectrum. In order to keep the relative error in D, within 10% it is necessary that the number N is greater than 3. In other words, this means that the waves must be received with a delay $\tau$ longer than $3/\Delta F$ (formula (7)), or if, formulae (2) and (7) are combined, the minimum range $D_{min}$ of the obstacle or the target must be equal to:

$$D_{min} = \frac{3c}{2\Delta F} \qquad (9)$$

Apart from the abovementioned disadvantages of two-antenna FM/CW radars, it is demonstrated that, on the other hand, two-antenna radars easily satisfy the accuracy and sensitivity conditions imposed in the range 4.2 to 4.4 GHz reserved for radioaltimeters. In particular a delay line, placed either in the transmission channel or in the reception channel, solves the problem of accuracy at lower altitudes, because it artificially increases the range of the target. In this case, the use of isolators reduces the internal leakages without attenuating the useful signal and it is thus possible to measure ranges from zero. With a single antenna, the problem of self-dazzle noise is much more difficult to solve: the radar receives, over the same channel, the wave reflected by the antenna and the useful wave coming, as an echo, from the target. The use of isolators and a delay line is therefore impossible without attenuating the useful signal.

The detection of close targets by a single antenna radar is therefore a problem which is intrinsically very difficult to solve. By way of indication, a frequency excursion $\Delta F$ of 150 MHz limits the radar measurement to ranges greater than 3 m, when the above formula (9) is applied. To further decrease the minimum range, an increase in the value of $\Delta F$ can be attempted but two difficulties then arise: on the one hand it is difficult to obtain a source which is linear in frequency over a wide frequency excursion, greater than 150 MHz. On the other hand, and this is the basic problem, the phase of the coefficient of reflection of the antenna is not linear over a wide pass band. In the short term, however, it would seem possible to obtain a suitable linearity of the order of 10% over an excursion $\Delta F$ of 300 MHz and a good antenna matching over 400 MHz with certain types of antennas. The minimum range could then be lowered, at least theoretically to 1.5 m with a $\Delta F$ of 300 MHz.

As a consequence of the quasi-theoretical limitations mentioned above, several techniques can be envisaged for producing a single-antenna radar:

The known technique of the radar known as "pseudo FM/CW" consists, for short range measurements, in chopping the transmitted signal according to sampling theory and in transmitting trains of waves whose duration must also be very short, for example less than 6.6 ns for a range to be measured of 1 m. It is still difficult to produce switches for microwave frequency signals as fast as this and this is a technological limitation for this technique. An FM/CW radioaltimeter has already been proposed in which the transmitter and the receiver function continuously using a common antenna. In this radioaltimeter the local signal of the radio frequency mixer of the receiver is obtained by reflection of the signal transmitted by the S.W.R. (Standing Wave Ratio) of the antenna. The construction is thus considerably simplified but to the detriment of the minimum measurable altitude, which can only reach 6 to 10 m, i.e. a value that is too high for the applications required for the radar according to the present invention. There is also known, particularly from French patent No. 2,541,465, a single-antenna FM/CW radar intended in particular for the measurement of short ranges and which raises exactly the same technical problem as in the present description: in a FM/CW radar equipment, if the transmitted signal and the reflected signal are duplexed on a common antenna, an interference signal due to coupling between the transmitter and the receiver is produced; this composite coupling signal results mainly in a partial reflection at the antenna which has a coefficient of reflection of finite and non-zero magnitude and in a leakage signal introduced by the duplexer circuit whose coefficient of directivity is technically limited. It follows that this composite radio frequency coupling signal, after demodulation in the input mixer of the receiver, creates, at the input of the audiofrequency amplifier of the receiver, interference signals which are partially situated in the useful pass band of the echo signal and with comparable amplitudes. This results in a limitation in the sensitivity of detection of a close object. In order to combat this lack of sensitivity, it is known that a static adjustment can be made which consists in adjusting the lengths of lines and possibly in adjusting a phase-shifter placed in one of these lines so that the phase of the local oscillation coincides with that of the main interference signals due to the S.W.R. of the antenna. The static adjustment is however insufficient in itself to achieve the required accuracy for range measurements in the order of 1.5 m to 3 m.

In the above mentioned French patent, an additional measurement, in order to improve the sensitivity of the radar, consists in introducing, after the input mixer of the reception channel, an audiofrequency amplifier having a second input which is connected, by means of a level modulator, to the frequency modulation signal generator of the transmitter, this level modulator having a control input sensitive to an adjustable d.c. voltage signal.

SUMMARY OF THE INVENTION

According to the present invention, the technical problems mentioned above are solved differently because of the fact that the FM/CW radar defined in the first paragraph is characterized in that a phase control loop including an amplifier and low pass filter is connected between the output of the said mixer and a control input of a phase-shifting circuit placed in the local oscillation channel, the closed loop cut-off frequency of the said control system being just lower than the frequency of the useful subtractive beat signal between the transmitted and received waves provided at the output of the mixer.

Such a control loop, carefully designed and arranged, compensates in a quasi-instantaneous way for the variable phase differences which necessarily exist between certain interference signals, such as, for example, the leakage signal of the mixer, and the local oscillation signal.

BRIEF DESCRIPTION OF THE DRAWING

The following description referred to the appended drawings, all given by way of example, will give a good understanding of how the invention can be embodied FIG. 1a shows as a function of time the useful output signal of the mixer shown in FIGS. 3 and 6, and FIG. 1b shows the associated spectrum.

FIG. 2a and 2b show curves similar to those of FIG. 1a and 1b for a lower range D of the radar system.

FIG. 4 is a Fresnel diagram which enables the operation of the radar to be explained.

FIG. 5 is a diagram showing the performance of the radar as a function of the range D.

DESCRIPTION OF THE PREFERRED EMBODIMENT

It has been seen above that it is not possible to introduce a delay line into a single-antenna radar, which makes difficult the detection of close targets as the transit time of the reflected wave is then very small. This problem, which is a theoretically difficult one, is illustrated by FIGS. 1 and 2, for which the wobulation frequency $\Delta F$ has been chosen as equal to 150 MHz. In FIG. 1, the range D is equal to 3 m (with $f_b = 25$ kHz) and the number n of sinusoids of the signal $v_b$ at the output of the mixer during the period T (see FIG. 1a) is equal to 3, in agreement with the above formula (7). The spectrum of the signal of figure 1a, shown in FIG. 1b, has a sin x/x envelope and the maximum of this spectrum is obtained very close to the beat frequency $f_b$ of 25 kHz. It will be noted that this is so for n greater than 3, i.e. for measurable ranges D greater than 3 m in the numerical application chosen by way of example. On the other hand, for n less than 3, i.e. D less than 3 m, the spectrum is distorted and the measurement of D becomes inaccurate or even impossible. In FIG. 2, the range D = 2 m, $f_b$ still being equal to 25 kHz, and n = 2.

The envelope of the spectrum in FIG. 2b is not similar to a sin x/x function. If the section of the envelope which surrounds the frequency $f_b$ of 25 kHz is taken, the local maximum of the envelope is no longer obtained for the frequency of 25 kHz, but for 22 kHz which, assuming that this maximum is detected, would cause an error in the range D of 12% according to formula (8). For a number of sinusoids less than 2, the envelope of the spectrum is further distorted until it becomes a monotonic decreasing curve in the vicinity of: D = 1 m, after which the measurement of D has no more physical significance. It will be noted that the value of $T_R$ has hardly any effect on the shape of spectra of the signals $V_b$.

Figure 3:
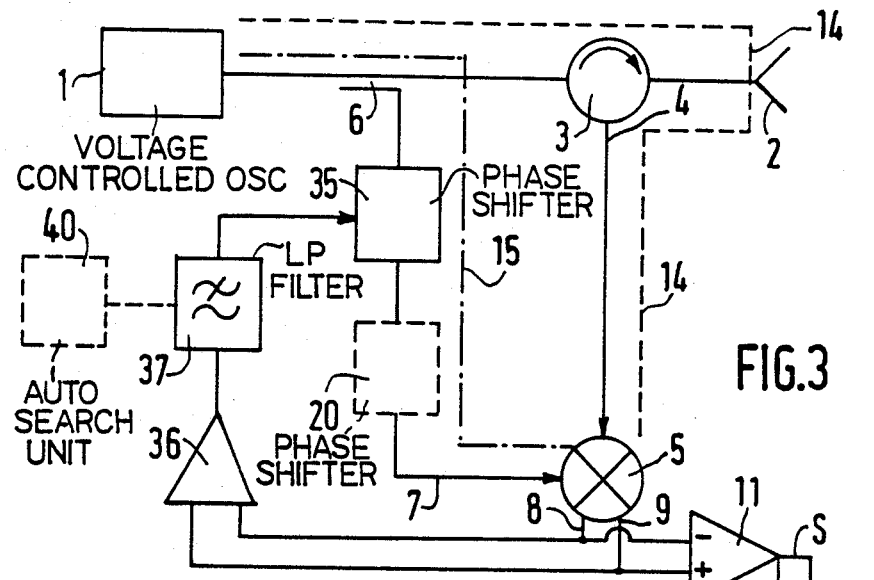
FIG. 3 is a block diagram of a first embodiment of the radar system according to the invention.

In addition to the theoretical limitations mentioned above, another difficulty in producing a single-antenna radar results from the size of the interference signals whose overall level it is appropriate to bring below that of the useful signal $v_b$. The study of these interference signals and their processing is described hereinafter with reference to the radar structure of FIG. 3. Part of FIG. 3 represents a standard radar system for range measurement including a transmission channel constituted by a voltage-controlled oscillator (VCO) 1 connected to an antenna 2 by means of a circulator 3. The VCO 1 is a microwave frequency generator which emits for example a signal in the form of a sawtooth, linear in frequency, positive asymmetrical, of duration T, between 4225 and 4375 MHz, i.e. a central frequency $F_o$ of 4.3 GHz, with a sawtooth repetition frequency $f_R = 1/T_R$, i.e. two consecutive sawteeth are separated by a level period of duration: $T_R - T$. A reception channel is constituted by the antenna 2 which for this purpose is a transmitting-receiving antenna designed for picking up the echo signal from the ground or from targets, and the circulator 3 of which one output is connected by a line 4 to a mixer 5, a fraction of the transmitted wave emitted by the VCO 1 being sampled by means of coupler 6 and directly transmitted, in the standard radar, to a second input of the mixer 5 by the line known as the local oscillation line 7. Preferably, the mixer 5 is a symmetrical mixer of $4\lambda/4$ type and its output, which is a double output, is transmitted by means of two conductors 8 and 9 to the negative and positive inputs of a differential amplifier 11. The output 12 of the amplifier 11 is the source of an audio frequency signal S which includes, among other things, the useful signal $v_b$ of frequency $f_b$ which is a subtractive beat frequency between the transmitted and received waves. The output 12 is connected to a processing circuit 13 which carries out the measurement of the range D. The means of modulation of the VCO 1, which are known, are not helpful for understanding the invention and have not been shown. All that is mentioned is that the frequency modulation must be obtained with good linearity.

Without special precautions, using the structure described above, the noise would be preponderant in the signal S, particularly at short ranges and it would be impossible to measure the range D for small ranges. In the radar according to FIG. 3, the noise is due to interference couplings of which two are dominant: the first, whose path is represented by the broken line 14, is caused by the antenna reflection. Considering a coefficient of reflection of $-10$ dB on the antenna, this interference coupling is equivalent to a transmitter-receiver coupling of $-10$ dB $-20$ LogD. The second interference coupling results from the leakage of the circulator 3. The equivalent coupling is equal to: $-25$ dB $-20$ LogD. A third results from the leakage from the mixer 5 with an equivalent coupling of: $-50$ dB $-20$ LogD. These three interference couplings together constitute what is currently called the self-dazzling noise of the radar. Each interference coupling causes a beat frequency with the local oscillator signal whose path is represented by the dotted and dashed line 15 in FIG. 1, this signal having an instantaneous phase of:

$$\phi_u = \frac{2\pi \cdot \Delta L_u \cdot F}{c} \qquad (10)$$

an expression in which:

u is a reference index of the interference coupling signal concerned;

$\Delta L_u$ represents the equivalent difference in electrical length between the local oscillation and the interference coupling concerned;

F is the instantaneous frequency of the transmitted signal.

The main difficulty in extracting the useful signal from the noise caused by the interference couplings, at the output of the mixer 5, is above all the fact that the main interference coupling signals have different electrical lengths from each other and particularly with respect to the local oscillation. A first means of implementation of the invention is to correctly identify the paths of the main interference couplings and to vary the electrical lengths of these paths in order to make them, as far as possible, equal to those of the local oscillation signal, which is called: static correction adjustment, in order to put these interference signals in phase with the local oscillation signal. This adjustment can however only be carried out on waves whose path is independent from the path of the local oscillation. Consequently, the third interference signal mentioned above, which results from the leakage of the mixer, cannot be compensated for, this latter signal fortunately having the lowest level of the three signals. This adjustment of lengths of line, reference $1_{OL}$ for the local oscillation and $1_{CP}$ for the interference couplings that can be statically compensated, naturally takes account of the various microwave frequency components encountered in the various paths, each of these components having an electrical length that can be measured and which is added to the length of the actual transmission line along the path concerned. In this way it is possible to lower the level of the antenna reflection signal to the value: $-35$ dB $-20$ LogD and the leakage signal of the circulator to the value: $-50$ dB $-20$ LogD. FIG. 4 illustrates, by means of a Fresnel diagram, the development of the various interference and useful beat signals, during the wobulation, in the form of vectors that are more or less movable with respect to the local oscillation vector referenced 16 which is taken as a reference vector. Starting from the top of the fixed vector 16, a vector 17 is constructed which represents the antenna reflection and the circulator leakage. By static adjustment, vector 17 is made to remain fixed with respect to the vector 16 during the wobulation, i.e. the resultant 18 of these two vectors also remains fixed. Preferably it is also sought to align the two vectors 16 and 17. In order to do this, in addition to static adjustment, an adjustable phase shifter can be introduced into reception channel 4 or the local oscillation channel 7. This phase shifter is represented in broken line at 20 in FIG. 3, in the local oscillation channel; it can be produced by means of a fixed adjustable capacitor. It is then necessary to take account of the equivalent electrical length of the phase shifter 20 during the static adjustment. Starting from the top of the vectors 17 and 18, in FIG. 4, other vectors such as 19 and 21 have been shown which symbolize other interference coupling signals that cannot be phase adjusted with respect to the local oscillation signal,i.e. leading or lagging with respect to the local oscillation signal, such as the leakage signal from the mixer 5 in particular. During the wobulation, the top of the vector 19, which advances with respect to the local oscillation, describes the curve 23 while the top 22 of the vector 21, which lags, describes the curve 24. The point 22 represents the end of the resultant vector, from which the vector representing the useful signal 25 can be drawn, having a low amplitude with respect to the previous vectors. During the wobulation, the vector 25, of peak 26, describes several revolutions about the point 22. By projection of the point 26 on the axis 27 perpendicular to the vector 16, the variation of the sought voltage $v_b$ is obtained. The motion of the point 22 and 26 can be even better displayed by introducing a time axis aligned on the vector 16. In the plane of the coordinates 27 and 28, the points 22 and 26 respectively describe the curves in full line 29 and in dotted line 31. In the absence of interference couplings, the curve 31 would be a sinusoidal wave along time axis ot. Attenuating the disturbing effect of the interference couplings is equivalent to approaching this theoretical sinusoid as far as possible. In order to do this, it is necessary to make the resultant 18 remain fixed and aligned on the vector 16 as mentioned above; but for vectors such as 19 and 21, other measures are necessary. The reduction in the amplitude of the interference vectors is an element favorable to the embodiment of the invention. In fact, the level of the useful signal represented by the vector 25 in FIG. 4, which is very low, can be calculated from the transmitted power Pe and the received power $P_r$ using the formula:

$$P_r = \frac{G \cdot \sigma_o \cdot \lambda^2}{(4\pi)^2 \cdot D^2} Pe \qquad (11)$$

G : gain of the antenna
$\tau_o$ : reflectivity of the ground
$\lambda$: length of the transmitted wave.

Typically, the useful signal achieves a level of: $-60$ dB $-20$ LogD. If comparison is made with the levels already mentioned above for the main interference signals, it is noted that after static adjustment it has been possible to improve the signal to noise ratio S/N from $-50$ dB to $-25$ dB, but this is insufficient and it would be appropriate to achieve a S/N ratio of $+10$ dB approximately. By way of indication, the envelope of the spectrum of the interference signals after static adjustment has been represented in dotted line at 33 in figure 1b, where it is noted that if only the spectrum lines adjacent to the beat frequency fb are considered, the S/N ratio is approximately 0 dB, which is a favourable feature, providing that there is appropriate filtering of the signal.

The invention solves the technical problem raised by also introducing a dynamic reduction of the interference couplings in the form of a phase control between the output 8, 9 of the mixer 5 and a phase shifter 35, in FIG. 3, preferably inserted in the local oscillation channel. It is a matter of attenuating the effect of the interference signals without interfering with the useful signal. Let $1_s$ be the equivalent electrical length of the useful coupling produced by the reflection of the wave on the ground. The phase shift:

$$2\pi \frac{(l_{OL} - l_{CP})}{\lambda}$$

is slaved to the value $\lambda/2$ or the value 0, depending on the type of mixer used and doing it in such a way that the phase shift introduced by the useful signal is not modified, namely:

$$2\pi \frac{(l_{OL} - l_S)}{\lambda}$$

For this purpose, the audio signal at the output of the mixer 5 controls, after amplification and filtering, the phase shifter 35. For example, the double output 8, 9 of the mixer 5 is connected to the two inputs of an operational amplifier 36, whose output is connected to a low-pass filter 37. The output of the filter 37 provides a voltage control of the phase shifter 35. This control enables a sensitivity of the mixer to be obtained which is dependent on the beat frequency of the audio signal, a sensitivity which is particularly improved for low values of $f_b$. The filtering carried out in 37 consists in only allowing frequencies lower than the beat frequency $f_b$ of the useful signal to pass through. In particular, when the frequency $f_b$ is maintained at a fixed value fbo (25 kHz for example) the cut-off frequency fc of the low-pass filter 37 must be lower than $f_{bo}$. In this way a quasi-instantaneous compensation is obtained for the disturbing effect of the interference signals which cannot be compensated for statically. Referring to FIG. 4 where the instantaneous resultant of the interference signals just mentioned is referenced 38, everything happens as if the resultant vector 18 were, at all times, aligned with the vector 38, which considerably improves S/N ratio.

In FIG. 4 this results in the move from 0' to 0" for the origin of the vector 18. Because of the dynamic compensation the S/N ratio can thus be raised to a value of the order on 10 dB as desired. The amplifier 36 in FIG. 3 can be a simple operational amplifier which also includes the filtering function of the low-pass filter 37. This operational amplifier for example has a cut-off frequency of 10 Hz in open loop and a gain of 100 dB. Considering the conversion factors of the mixer 5 and the phase shifter 35, the cut-off frequency in closed loop is 20 kHz. The filter is a single pole filter, giving a gain characteristic of 20 dB per decade, which provides the control loop with good stability. Such control does not affect the useful signals, the loop being closed only for the interference signals and having a greater effect as the beat frequency of the interference signals becomes low, i.e. for values of beat frequency for which the level of these interference signals is highest. It should be noted that, so that the phase-shifter 35 is capable of compensating for the residual delays of the interneral echoes, it is necessary that the phase shift $\alpha$ between the resultant of the interference voltage signals, namely the vector 46 in FIG. 4, and the local oscillation signal, remains within the field of action of the phase-shifter. This restriction is basically satisfied because of the static adjustment described above; the other interference waves, weaker, cannot generally create a large phase shift in the total interference wave. In practice, the phase-shifter 35 can be produced by means of single diode, the phase variation of the vector 46 being of the order of $\pi/2$. If this phase variation is required to exceed the value $\pi/2$, it is necessary to use a phase-shifter capable of operating for such an increased phase variation.

It will also be noted that the beat frequency $f_b$ of the useful signal does not have to be maintained at a fixed value $f_{bo}$. In certain radioaltimeters it is known that the frequency excursion $\Delta F$ and the slope p of the wobulation ramp p are left constant; in these conditions the beat frequency $f_b$ is directly proportional to the range D to be measured. According to the above-mentioned criteria for the operation of the filter 37, it is then necessary to adjust the cut-off frequency $f_c$ of the filter to each frequency $f_b$. In practice, such a control of the filter 37 can be carried out by the automatic search unit, 40 in FIG. 3, which enables a locking onto the sought range D particularly during the switching on of the radioaltimeter, by means of a systematic test for increasing or decreasing values of slope p.

FIG. 5 shows the performance of the radar according to the invention. Four curves have been shown which express levels in dB, as a function of the range D on a logarithmic scale. Curve 41 in dotted line represents the self-dazzling noise of the radar with static compensation (adjustment) only; curve 42 in dotted line is that of the self-dazzling noise with static and dynamic compensations; curve 44 in mixed line represents the thermal noise level of the radar. Curve 43 in full line, situated between curves 41 and 42, represents the level of the lowest useful signals. It is noted that the signal to noise ratio S/N, which is the difference in vertical coordinates between curves 42 and 43, varies from 30 dB to 10 dB as D varies from 100 m to 3 m.

Figure 6:
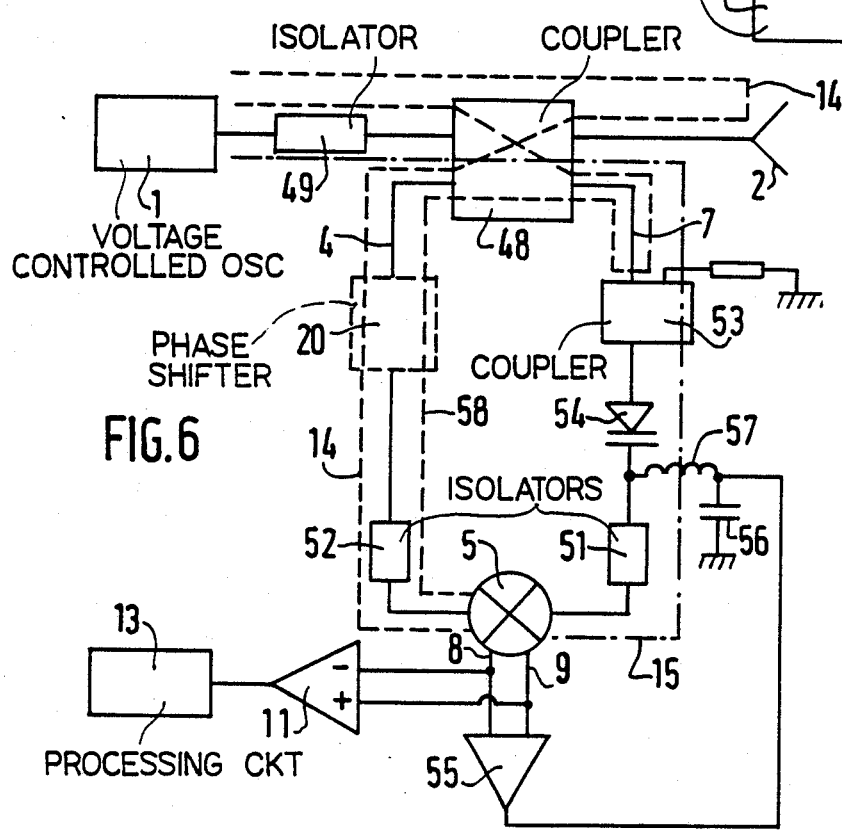
FIG. 6 is a block diagram of a second embodiment of the radar system according to the invention.

FIG. 6 shows a second embodiment of the invention in which a 3 dB coupler 48 is used. The same components as those in FIG. 3 bear the same references. The 3 dB coupler 48 performs together the functions provided by the circulator 3 and the coupler 6 in FIG. 3. The device of FIG. 6 includes three isolators: one isolator 49 in the transmission channel, one isolator 51 in the local oscillation channel and one isolator 52 in the reception channel of the useful signal. It will be noted that these isolators are particularly useful for improving the sensitivity at high ranges but are not indispensable for low ranges. The adjustable phase-shifter 20, again optional, is shown here in the reception channel. The local oscillation channel 7 includes, between the 3 dB coupler 48 and the mixer 5, which is preferably a symmetrical $4\lambda/4$ type mixer, a 12 dB coupler 53 serving as an attenuator, the phase-shifter 54 for controlling the phase of the local oscillation constituted by a varicap diode and, preferably, the isolator 51. The control loop includes an operational amplifier 55 followed a microwave frequency decoupling constituted by the capacitor 56 and the inductance 57.

In the radar configuration of FIG. 6, an additional interference coupling must be taken into account: it is the reflection of the transmission signal on the 12 dB coupler 53, whose path is referenced 58. This interference signal can be compensated for statically as its path is, essentially, independent from the local oscillation channel; in FIG. 4, it is represented by the vector in dotted line 59, the reflection interference coupling of the antenna being represented by the vector in dotted line 17'. The main couplings for the radar of FIG. 6 are for example as follows:

antenna reflection: 21 dB for a reflection coefficient of $-15$ dB;

reflection of the 12 dB coupler 53: $-21$ dB for a coefficient of reflexion of $-15$ dB;

leakage of the 3 dB coupler 48: $-25$ dB;

leakage of the mixer and reflection of the reception isolator: $-45$ dB.

The static reduction consists in an adjustment of the lengths of the lines traveled by the two dominant $-21$ dB couplings. Preferably, the antenna 2 is placed very close to the 3 dB coupler 48 and it includes a matching, i.e. a line placed in front of the antenna enables an equalization of the delays of these two reflections. The length of the two interference paths 14 and 58, is then adjusted to that of the local oscillation (path 15). In the case in which the phase shift of the resultant vector 17 with respect to the vector 16 would be too high, at this stage of the static adjustment, the phase-shifter 20 is introduced, its equivalent electrical length is measured and the length of the line 4 and/or 7 is consequently corrected, then the relative phase between the two signals at the input of the mixer 5 is adjusted to bring it to a value of the order 5 to 10 degrees. After these adjustments, the dynamic compensation can be carried out in a similar way to that which has been described above with reference to FIG. 3. After dynamic compensation, in both cases, the level of the interference signals is reduced to the value: $-66$ dB $-40$ LogD, which produces a signal to noise ratio: S/N $=6$ dB $+20$ LogD. It will be noted that the predominance of the local oscillation vector over the resultant of the interference vectors provides a relatively constant power to the diodes of the mixer 5 and therefore a wide-band matching of the mixer; for example a variation of 10 dB in the antenna reflection produces a fluctuation of only 3 dB in the total power. Preferably, the varicap diode 54 is placed, in series in the transmission line of the local oscillator, at a place such that the variation in capacity produces a large phase-shift. This position can be defined by the phase of the coefficient of reflection of the isolator 51. The phase-shifter therefore operates on about 90°, which enables the compensation of large external echoes such as those caused by drops of water on the antenna. As for the operational amplifier 55, this also has the role of a filter; its gain is 100 dB at 10 Hz in open loop and decreases by 20 dB per decade for higher frequencies.

For the radars of FIGS. 3 and 6, very compact microwave frequency units can be obtained with short lines by using the printed circuit technique. When printed circuit cards are obtained after the adjustments of the lengths of lines 4, 7 as mentioned above, it is possible to mass produce those cards with good accuracy. The antenna can also be a printed antenna, such as the antenna type 122 of the French Company T.R.T. Taking account of the expansions of Teflon glass for example, the electrical length of a 50 Ω microstrip line is stable to the nearest 1% over a temperature range of from $-50°$ C. to 75° C. If this uncertainty is considered over a local oscillation line of 50 cm and assuming a stable antenna reflection, the corresponding variation in electrical length is 5 mm, which results in a phase shift of only 15° for a transmission frequency of 4.3 GHz.

The invention is preferably applied to "intelligent" weapons, such as missiles, on which little space is available and where the use of a single antenna instead of two is desirable; for this application, the device according to the invention is preferably used as a radio-altimeter enabling the measurement of altitudes between 3 and about 1000 m. This device can also be used as a radar because of its single antenna which is easy to make mobile for the detection of point targets. In this latter case, the received power is derived from the formula:

$$P_r = \frac{G^2 \cdot \delta_R \cdot \lambda^2}{(4\pi)^3 \cdot D^4} P_e \quad (12)$$

where:

$\delta_R$: equivalent radar area.

The radar according to the invention can detect targets having an equivalent area of 1 m² and above, but with a maximum range of 100 m beyond which the thermal noise becomes predominant over the self-dazzling noise. To measure higher ranges, a high gain antenna, or a higher transmission power, becomes necessary.

It is possible to extent the cover of the radar according to the invention to ranges lower than 3 m by increasing the value of the wobulation frequency ΔF, taking it to 300 MHz for example, and by choosing an antenna whose coefficient of reflection has a linear phase over a wide pass band, such as, for example, the 140 type antenna of the T.R.T. company, which has good matching over a 400 MHz range.

What is claimed is:

1. A radar system of the frequency modulated continuous wave type (FM/CW), intended for range measuring, including a linearly frequency-modulated microwave signal generator, a transmitter-receiver antenna and deriving means for deriving a fractional signal of the transmitted wave to effect production of a local oscillation signal and for deriving a fractional signal of the received echo wave and transmission lines for transmitting the derived signals to the inputs of a mixer, the lengths of the transmission lines being adjusted so that at least the internal interference coupling signal due to the antenna reflection has, up to the mixer, the same propagation time as the local oscillation signal, characterized in that a phase control loop including an amplifier and a low pass filter is connected between the output of the mixer and a control input of a phase-shifting circuit placed in the local oscillation channel, the closed loop cut-off frequency of the control loop being lower than the frequency of the useful subtractive beat signal between the transmitted and received waves provided at the output of the mixer.

2. A radar system as in claim 1, where the deriving means comprises a coupler for deriving the local oscillation, and a circulator for deriving the received echo wave.

3. A radar system as in claim 1, where the deriving means comprises a 3 dB coupler and where the local oscillation channel includes a signal attenuating coupler, characterized in that the static adjustment of the transmission lines takes into account the interference coupling caused by the reflection of the transmitted signal on the attenuating coupler.

4. A radar system as in claim 1, 2 or 3, including an adjustable phase-shifter in one of two signal channels which connect the deriving means to the mixer.

5. A radar system as in claim 1, 2 or 3, where the mixer is a symmetrical 4λ/4 type mixer with two outputs and where the phase-shifting circuit comprises a varicap diode.

6. A radar system as in claim 1, 2 or 3, characterized in that the amplifier and the low-pass filter are collectively formed by an operational amplifier.

7. A radar system as in claim 1, 2 or 3, characterized in that it includes automatic means for adjustment of the cut-off frequency as a function of the range to be measured, said means controlling the low pass filter.

8. A radar system as in claim 7, characterized in that the automatic means for adjustment is controlled by an automatic search device intended to obtain the locking of the radar system onto at least one sought range.

9. A radar system as in claim 1, 2 or 3, characterized in that lines for carrying the microwave frequency signals comprise printed circuit transmission lines.

* * * * *